(12) United States Patent
Osada

(10) Patent No.: US 10,805,544 B2
(45) Date of Patent: Oct. 13, 2020

(54) IMAGE PICKUP APPARATUS EQUIPPED WITH PLURALITY OF DISPLAY DEVICES

(71) Applicant: CANON KABUSHIKI KAISHA, Tokyo (JP)

(72) Inventor: Yoichi Osada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/580,776

(22) Filed: Sep. 24, 2019

(65) Prior Publication Data

US 2020/0099863 A1 Mar. 26, 2020

(30) Foreign Application Priority Data

Sep. 26, 2018 (JP) .................................. 2018-180670

(51) Int. Cl.
*H04N 5/232* (2006.01)
*H04N 5/225* (2006.01)

(52) U.S. Cl.
CPC ... *H04N 5/23293* (2013.01); *H04N 5/225251* (2018.08); *H04N 5/23218* (2018.08)

(58) Field of Classification Search
CPC ........... H04N 5/23293; H04N 5/23218; H04N 5/225251
See application file for complete search history.

(56) References Cited

U.S. PATENT DOCUMENTS

| 2014/0176603 | A1* | 6/2014 | Kumar | G06F 3/011 |
| | | | | 345/633 |
| 2014/0313390 | A1* | 10/2014 | Uemura | H04N 5/2256 |
| | | | | 348/335 |
| 2017/0045805 | A1* | 2/2017 | Sato | H04N 5/23245 |
| 2017/0054914 | A1* | 2/2017 | Sato | H04N 5/225 |
| 2017/0054915 | A1* | 2/2017 | Sato | H04N 5/2251 |
| 2017/0054916 | A1* | 2/2017 | Sato | H04N 5/2251 |
| 2017/0187964 | A1* | 6/2017 | Sato | H04N 5/23293 |
| 2019/0394403 | A1* | 12/2019 | Osada | H04N 5/23293 |

FOREIGN PATENT DOCUMENTS

JP 2015-227901 A 12/2015

\* cited by examiner

*Primary Examiner* — Shahbaz Nazrul
(74) *Attorney, Agent, or Firm* — Cowan, Liebowitz & Latman, P.C.

(57) ABSTRACT

An image pickup apparatus that is capable of switching a display device that is used to display appropriately. A first display device at a rear face of a body of the apparatus and is rotatable upward around a first rotation axis. A second display device has an eyepiece and is movable between a housing position and a use position. A first sensor detects whether the eyepiece is in the use position. A second sensor detects approaching of an object to the eyepiece. A controller controls the first and second display devices based on detection results of the first and second sensors. The controller enables predetermined control set in association with the detection result of the second sensor when the first sensor detects that the eyepiece is in the use position and disables the predetermined control when the first sensor detects that the eyepiece is not in the use position.

9 Claims, 12 Drawing Sheets

IMAGE PICKUP APPARATUS EQUIPPED WITH PLURALITY OF DISPLAY DEVICES

BACKGROUND OF THE INVENTION

Field of the Invention

The present invention relates to an image pickup apparatus that is equipped with a plurality of display devices.

Description of the Related Art

An image pickup apparatus like a digital camera that stores an image signal (image information) output from an image sensor as a data file has spread widely. Generally, such an image pickup apparatus is provided with a display device like an LCD at a rear surface of a body of the image pickup apparatus for checking an object at a time of shooting and for reproducing a shot image. Then, there is a known image pickup apparatus of which a display device arranged at a rear surface of the image pickup apparatus body is rotatable with respect to the body using a hinge mechanism. For example, even when a user changes a position or an orientation of the image pickup apparatus with respect to an object, the user is able to check the object while squarely facing a screen of the display device by rotating the display device provided in the rear surface of the image pickup apparatus body so that the screen is directed to the user.

Moreover, there is another image pickup apparatus provided with a display device that is rotatable upward by about 180 degrees. It should be noted that the rotating of the display device upward by about 180 degrees means the rotating of the display device around the upper side of the display device as a rotation axis by about 180 degrees so that the lower side will draw a circular arc. When the display device is rotated upward by about 180 degrees, the screen of the display device is directed to the object side. This provides a shooting position suitable for what is called selfie shooting that a user shoots oneself while checking an object image.

In the meantime, there is another known image pickup apparatus that is provided with an electronic view finder aside from a display device provided in a rear surface of an image pickup apparatus body. The electronic view tinder includes a small display, a lens, and an eyepiece window and enables a user who looks into the eyepiece window to check (visually confirm) of an object image or a reproducing image. For example, Japanese Laid-Open Patent Publication (Kokai) No. 2015-227901 (JP 2015-227901A) discloses an image pickup apparatus provided with a retractable electronic view finder that is retracted inside the image pickup apparatus body when it is not in use and that projects from the image pickup apparatus body and becomes usable when it is in use. The image pickup apparatus disclosed in this publication has a display device that is provided in a rear surface of the image pickup apparatus body and that is rotatable upward by about 180 degrees as mentioned above. In addition, a detection sensor that detects approaching of an object is provided in a rear-upper position of the image pickup apparatus body. Then, when the detection sensor detects approaching of a human face, display of an image on the electronic view finder is started and display on the display device provided in the rear surface of the image pickup apparatus body is stopped.

However, the technique disclosed in the above-mentioned publication has a problem that the display on the display device provided in the rear surface of the image pickup apparatus body may turn off (go off) unexpectedly when the display device rotated upward by a predetermined angle enters a detection range of the detection sensor.

SUMMARY OF THE INVENTION

The present invention provides an image pickup apparatus equipped with a plurality of display devices including a rotatable display device that is capable of switching a display device that is used to display appropriately in response to a rotation angle of the rotatable display device.

Accordingly, a first aspect of the present invention provides an image pickup apparatus including a first display device that is provided in a rear face of a body of the image pickup apparatus and is rotatable upward around a first rotation axis, a second display device having an eyepiece that is movable between a housing position and a use position, a first sensor that detects whether the eyepiece is in the use position, a second sensor that detects approaching of an object to the eyepiece, and a controller that controls the first display device and the second display device based on a detection result of the first sensor and a detection result of the second sensor. The controller enables predetermined control that is set in association with the detection result of the second sensor a state where the first sensor is detecting that the eyepiece is in the use position and disables the predetermined control in a state where the first sensor is detecting that the eyepiece is not in the use position.

Accordingly, a second aspect of the present invention provides an image pickup apparatus including a first display device that is provided in a rear face of a body of the image pickup apparatus and is rotatable upward around a first rotation axis, a second display device having an eyepiece that is movable between a housing position and a use position, a sensor that detects whether the eyepiece is in the use position, and a controller that controls the first display device and the second display device based on a detection result of the sensor. The controller displays on the second display device without displaying on the first display device in a case where the sensor is detecting that the eyepiece is in the use position. The controller displays on the first display device without displaying on the second display device in a case where the sensor is not detecting that the eyepiece is in the use position.

According to the present invention, the image pickup apparatus equipped with a plurality of display devices including a rotatable display device becomes capable of switching a display device that is used to display appropriately depending on a rotation angle of the rotatable display device.

Further features of the present invention will become apparent from the following description of exemplary embodiments with reference to the attached drawings.

BRIEF DESCRIPTION OF E DRAWINGS

Figure 3A:
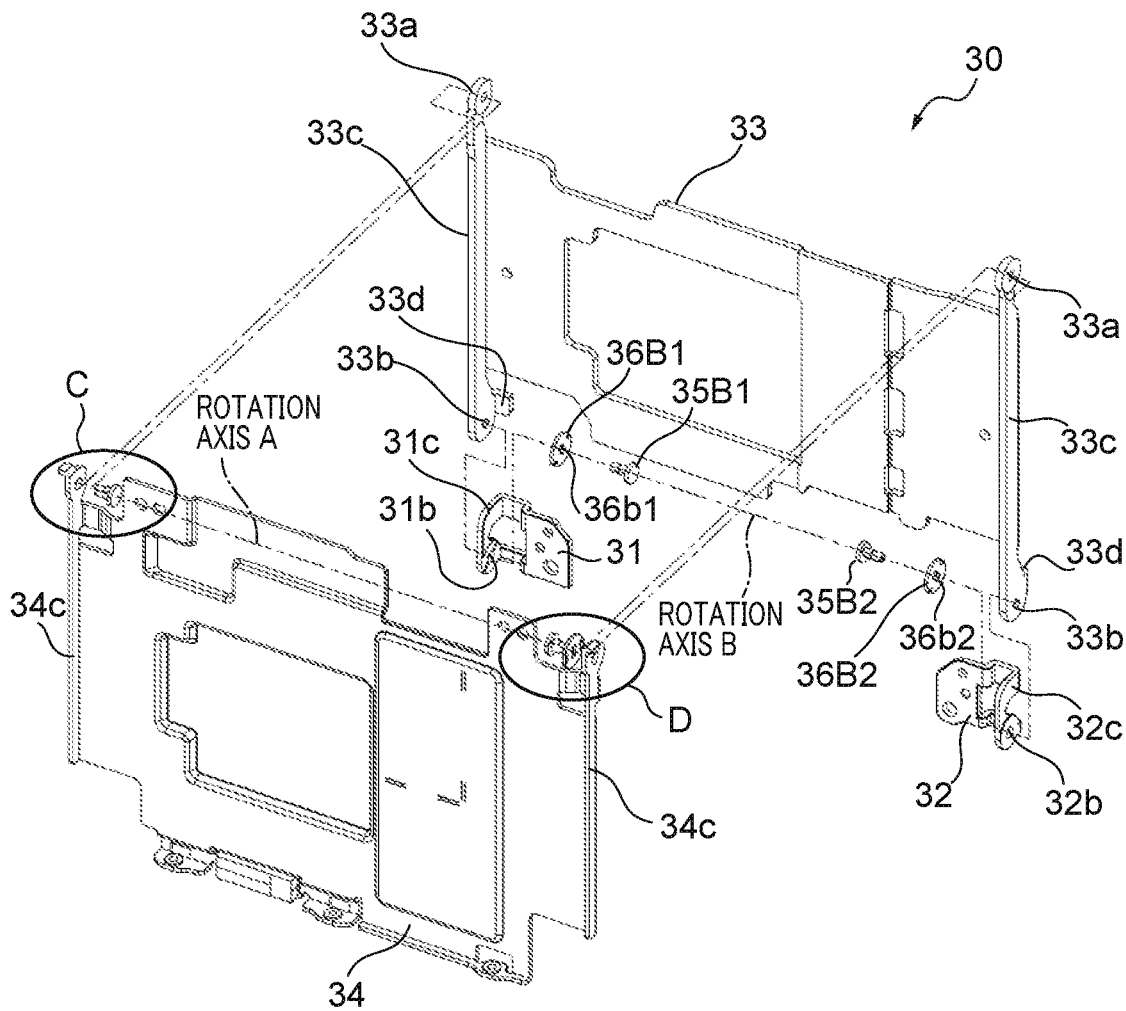
Figure 3B:
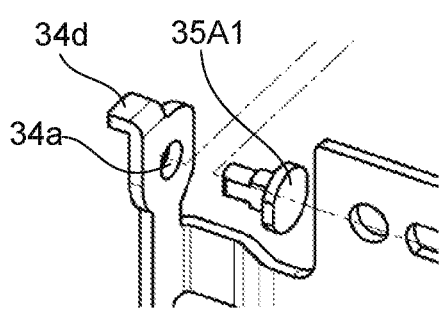
Figure 3C:
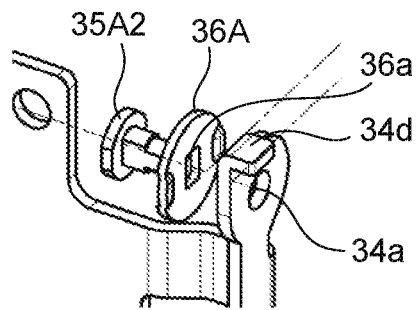

FIG. 3A, FIG. 3B, and FIG. 3C are exploded perspective views showing a hinge mechanism that connects a body of the image pickup apparatus and the display device.

Figure 4:
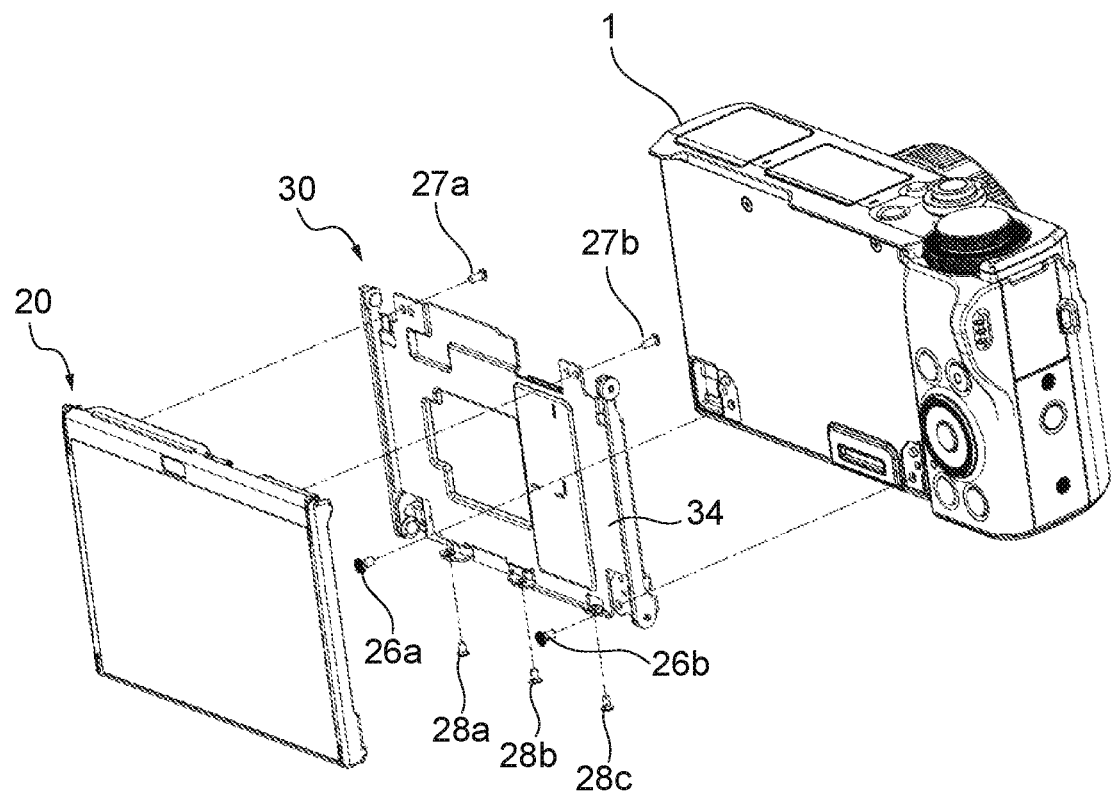

FIG. 4 is an exploded perspective view showing the image pickup apparatus.

Figure 5A:
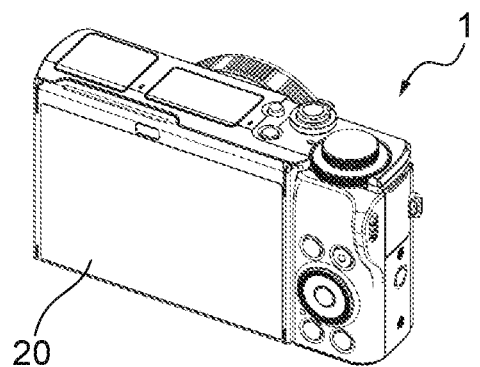
Figure 5B:
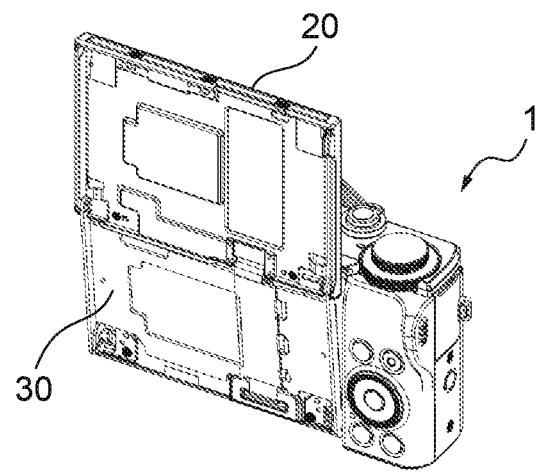
Figure 5C:
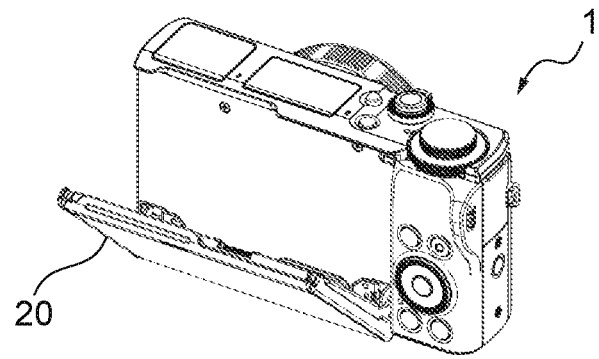

FIG. 5A, FIG. 5B, and FIG. 5C are perspective views for describing typical examples of postures that the display device can take.

Figure 6:
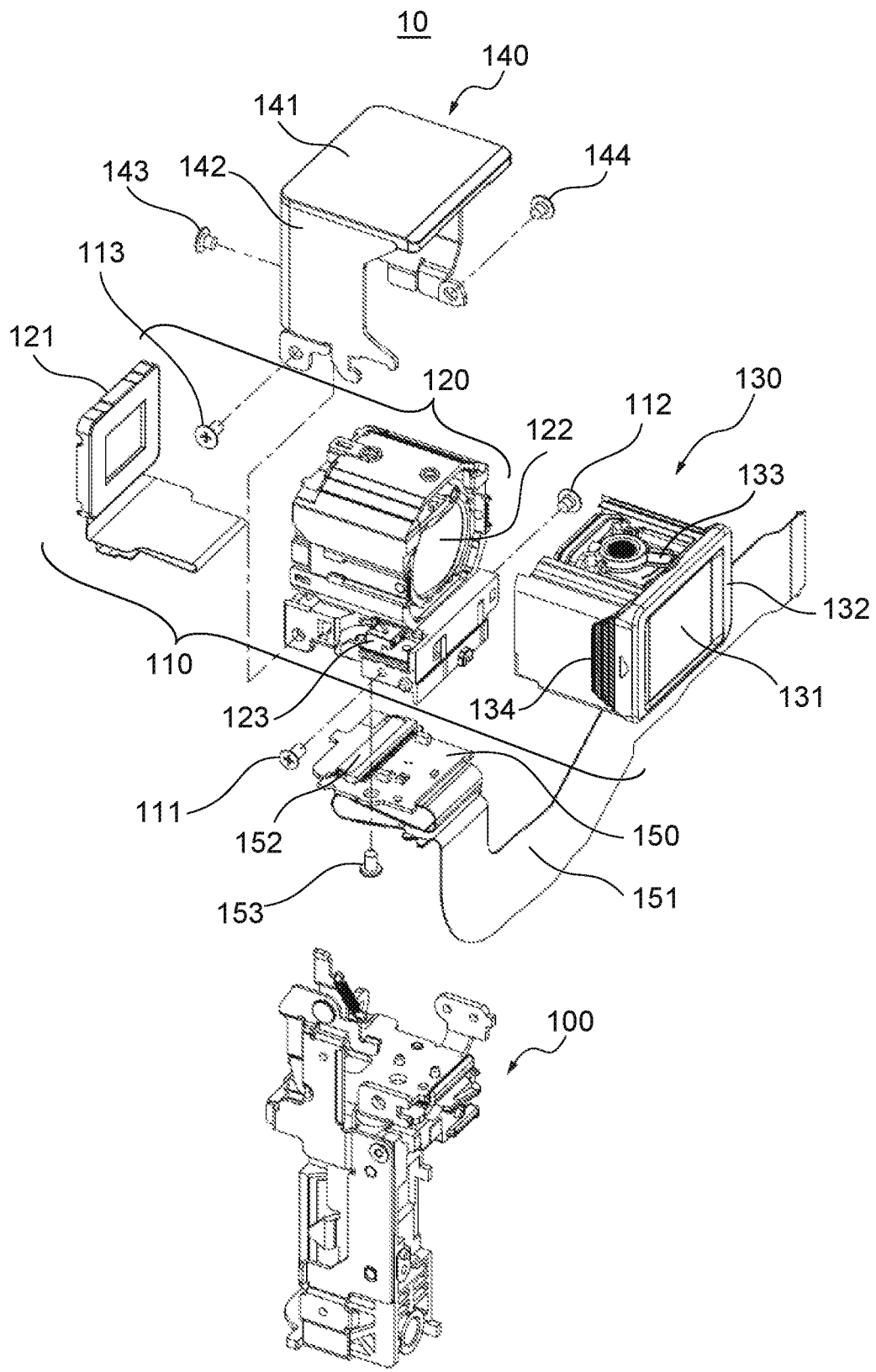

FIG. 6 is an exploded perspective view showing an electronic view finder device with which the image pickup apparatus is equipped.

Figure 7A:
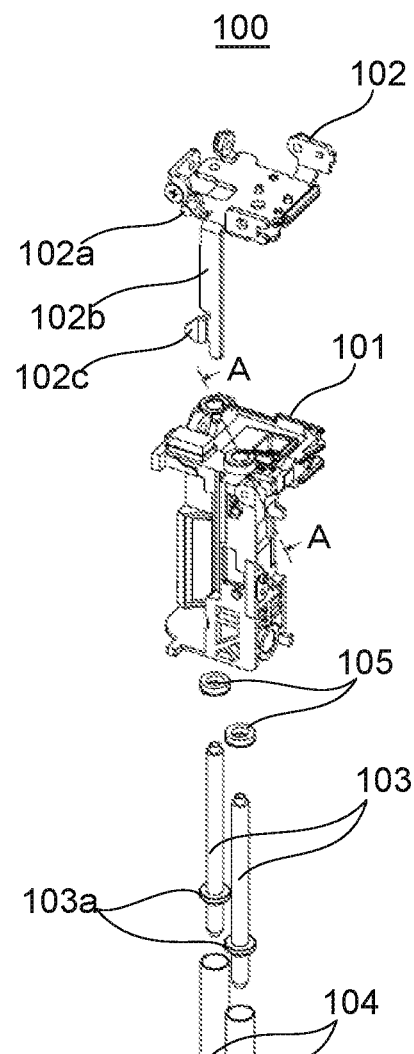
Figure 7B:
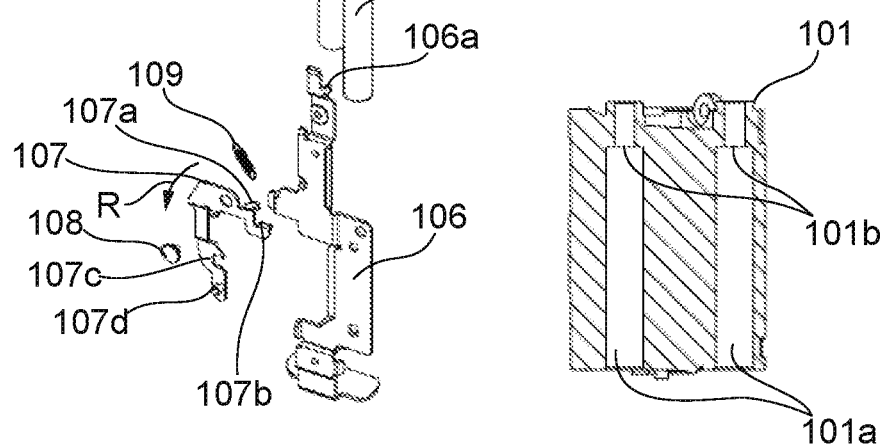

FIG. 7A is an exploded perspective view of a base unit that constitutes the electronic view finder device, and FIG. 7B is a sectional view from an arrow A-A in FIG. 7A.

FIG. 8A, FIG. 8B, FIG. 8C, and FIG. 8D are side views for describing an action of the electronic view finder device.

FIG. 9A, FIG. 9B, FIG. 9C, and FIG. 9D are side views for describing a relation between a posture of the display device and a detection range of a proximity sensor.

FIG. 10A, FIG. 10B, FIG. 10C, and FIG. 10D are side views of the image pickup apparatus in a state where the electronic view finder device is available and the display device is rotated to a predetermined angle.

Figure 11A:
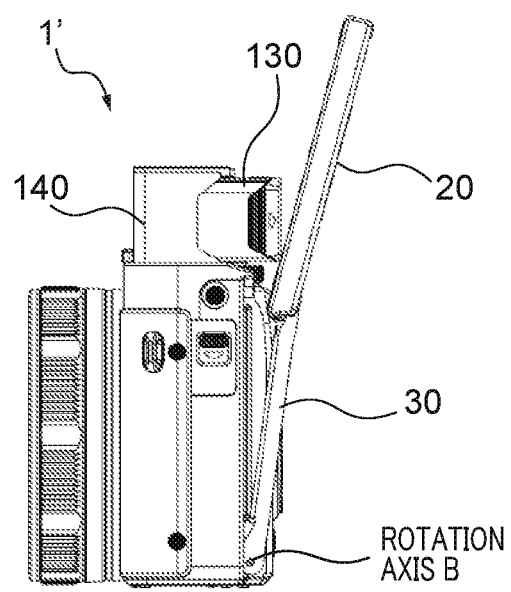
Figure 11B:
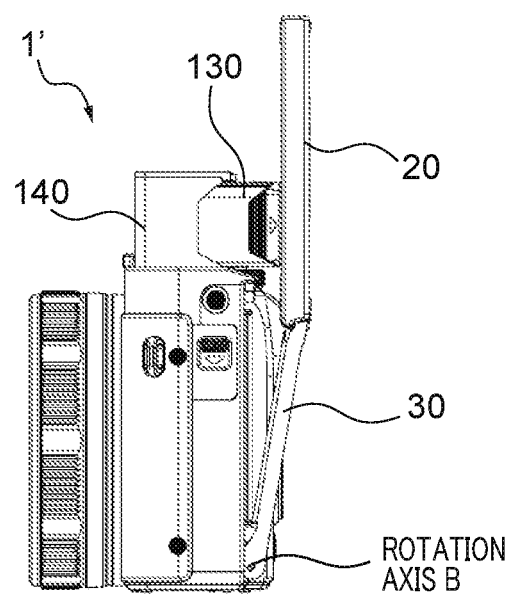

FIG. 11A and FIG. 11B are side views showing an image pickup apparatus concerning a reference example.

Figure 12A:
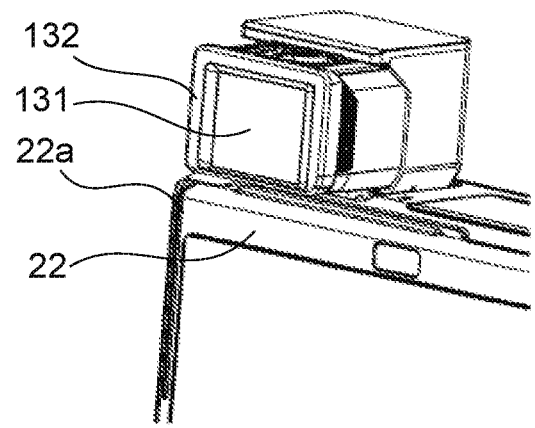
Figure 12B:
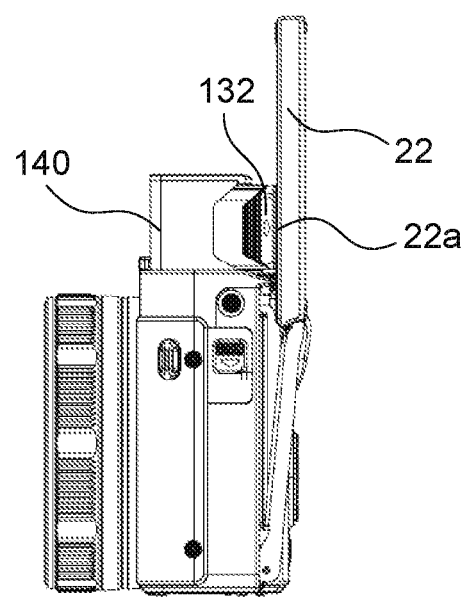

FIG. 12A and FIG. 12B are views for describing a configuration in which a rib is provided in the display device.

DESCRIPTION OF THE EMBODIMENTS

Hereafter, embodiments according to the present invention will be described in detail by referring to the drawings.

Figure 1A:
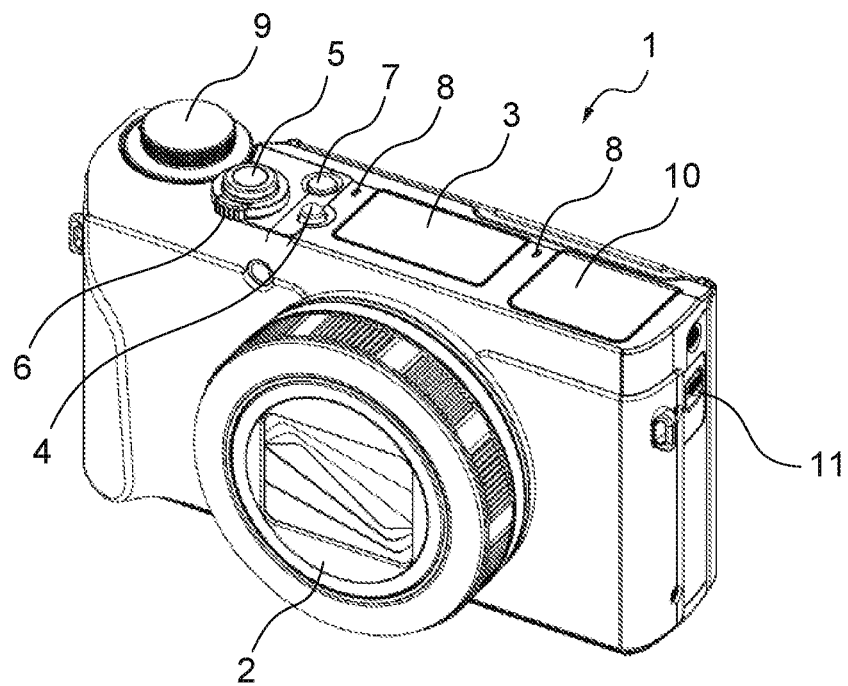
FIG. 1A and FIG. 1B are perspective views showing an image pickup apparatus according to a first embodiment of the present invention.
Figure 1B:
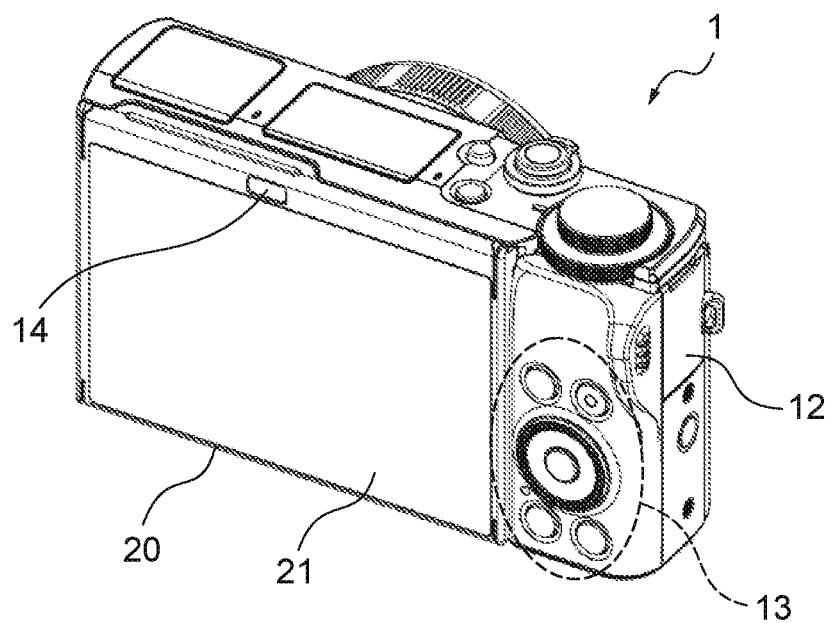

First, a first embodiment of the present invention will be described. FIG. 1A is a perspective view showing an image pickup apparatus 1 concerning the first embodiment viewed from an approximate front side. FIG. 1B is a perspective view showing the image pickup apparatus 1 viewed from an approximately rear side. It should be noted that reference numerals applied to parts and components in FIG. 1A are omitted in FIG. 1B about the parts and components of which correspondences are clear. Moreover, in the following description, expressions that point out a vertical direction and a lateral direction are premised on a state where the image pickup apparatus 1 is in a regular posture as shown in FIG. 1A except for describing case by case.

A not-shown image pickup device (image sensor), such as a CCD and a CMOS, that generates image data by photoelectrically converting an optical image is arranged inside the body of the image pickup apparatus 1. A lens barrel unit 2 that has an image pickup lens that forms an object image on the image sensor is arranged in the front of the image pickup apparatus 1. It should be noted that the body of the image pickup apparatus 1 means an approximately rectangular parallelepiped portion (housing) excluding the lens barrel unit 2, a display device, and a hinge mechanism (mentioned later) from the image pickup apparatus 1.

The lens barrel unit 2 is retractable. The lens barrel unit 2 is extended from the body of the image pickup apparatus 1 when shooting and is retracted into the body of the image pickup apparatus 1 as shown in FIG. 1A when not shooting (when stored). It should be noted that a main substrate and an auxiliary substrate (not shown) on which a processing circuit that converts an electrical signal (image signal) output from the image sensor into image data as digital information is implemented are arranged in the body of the image pickup apparatus 1.

An electronic flash device 3, a flash button 4, a release button 5, a zoom lever 6, a power button 7, a pair of microphone holes 8, a mode setting dial 9, and an electronic view finder device 10 (a second display device, hereinafter referred to as an "EVF10") are provided in the upper surface of the image pickup apparatus 1. An operation lever 11 is provided in one side surface of the image pickup apparatus 1 and a jack cover 12 is provided in the other side surface of the image pickup apparatus 1. An operation button group 13, a proximity-sensor window 14, and a display device 20 (a first display device) are provided in the rear surface of the image pickup apparatus 1.

The electronic flash device 3 is stored in the body of the image pickup apparatus 1 in the state shown in FIG. 1A and FIG. 1B. When shooting an object with insufficient brightness, a user presses the flash button 4 so that a light-emitting window directed to the object will project from the image pickup apparatus 1. When an emission device (not shown) of the electronic flash device 3 emits light, the object is shot with flash irradiation (flash photographing). The electronic flash device 3 projected from the image pickup apparatus 1 is returned to the state where it is stored in the body of the image pickup apparatus 1 by operating so that a top surface of the electronic flash device 3 will be pushed into the image pickup apparatus 1.

The release button 5 is configured to enable two steps of press operations. A half press operation (first step) of the release button 5 starts shooting preparation operations (a photometry operation (AE), a focusing operation (AF), etc.). A full press operation (second step) of the release button 5 starts shooting an object and storing image data of the object image into a storage medium (not shown).

The zoom lever 6 is a rotational operation member that is rotatably held around the release button 5. When the zoom lever 6 is rotationally operated in one direction, a zoom operation in a telephoto direction (a direction narrowing a field angle) is performed in the lens barrel unit 2. When the zoom lever 6 is rotationally operated in the other direction, a zoom operation in a wide-angle direction (a direction spreading the field angle) is performed. When the power button 7 is pressed, a state of the image pickup apparatus 1 is switched between an unavailable state (OFF state) and an available state (ON state). It should be noted that a battery (not shown) used as a power source and the storage medium storing image data are included in the body of the image pickup apparatus 1.

The microphone holes 8 are provided in the top surface of the image pickup apparatus I in consideration of a sound collection property in order to take sound into a microphone unit (not shown) built in the body of the image pickup apparatus 1. The two microphone holes are provided so as to have a predetermined interval therebetween in a width direction of the image pickup apparatus 1 in order to enable stereo recording. The mode setting dial 9 is a rotational operation member for selecting a photographing mode. A plurality of icons (not shown) corresponding to various shooting modes are printed on a top surface of the mode setting dial 9. When matching an icon of a desired mode to an index (not shown) provided in the image pickup apparatus 1, a user is able to operate the image pickup apparatus 1 in the desired shooting mode.

The EVF 10 is stored in the body of the image pickup apparatus 1 in the state shown in FIG. 1A. A display unit 110 and a cover unit 140 (see FIG. 6 through FIG. 8D) of the EVF 10 project upward by sliding the operation lever 11, which is provided in the side surface of the image pickup apparatus 1, downward. This enables an eyepiece window 131 (see FIG. 6) included in the display unit 110 to be exposed directed to the a side of the image pickup apparatus 1. Details will be mentioned below. The EVF 10 is provided with an organic EL panel 121 and a lens 122 (see FIG. 6). Details of the configuration of the EVF 10 will be mentioned later. A user is able to check (visually confirm) an object image or a shot image (a reproducing image) by looking the inside of the EVF 10 through the eyepiece window 131.

When the jack cover 12 provided in the side surface of the image pickup apparatus 1 is opened, a DC-in jack and a signal input/output jack are exposed, which enables insertion and extraction of cables to the jacks. The operation button group 13 includes a plurality of buttons, such as independent buttons and a cross button. A predetermined function is allocated to each of the buttons in the operation button group 13. For example, various instructions, such as an instruction for changing a shooting condition and an instruction for switching to a reproduction screen, can be input through the operation button group 13.

The display device 20 has an LCD 21 used as a display screen, for example, and displays an object image (a live image), a shot image, a setting menu for the image pickup apparatus 1, etc. The display device 20 is attached to the body of the image pickup apparatus 1 through the hinge mechanism 30 (see FIG. 3A through FIG. 5C) so as to be rotatable in the vertical direction. Details will be mentioned later.

The proximity-sensor window 14 is provided in an upper frame of the display device 20. The proximity-sensor window 14 is made from resin that has a small transmittance in the visible ray region and has a large transmittance in the infrared region beyond the wavelength of 800 nm. Moreover, a proximity sensor (second sensor) 14a (see FIG. 2B) equipped with a light emitting section and a light receiving section is arranged inside the proximity-sensor window 14. The proximity sensor 14a emits infrared light from the light emitting section and detects the reflection light with the light receiving section. When the level of the detected reflection light exceeds a set-up threshold, it is determined that an object is approaching. The proximity sensor 14a is used in order to determine whether the user is looking into the eyepiece window 131 of the EVF 10.

Figure 2A:
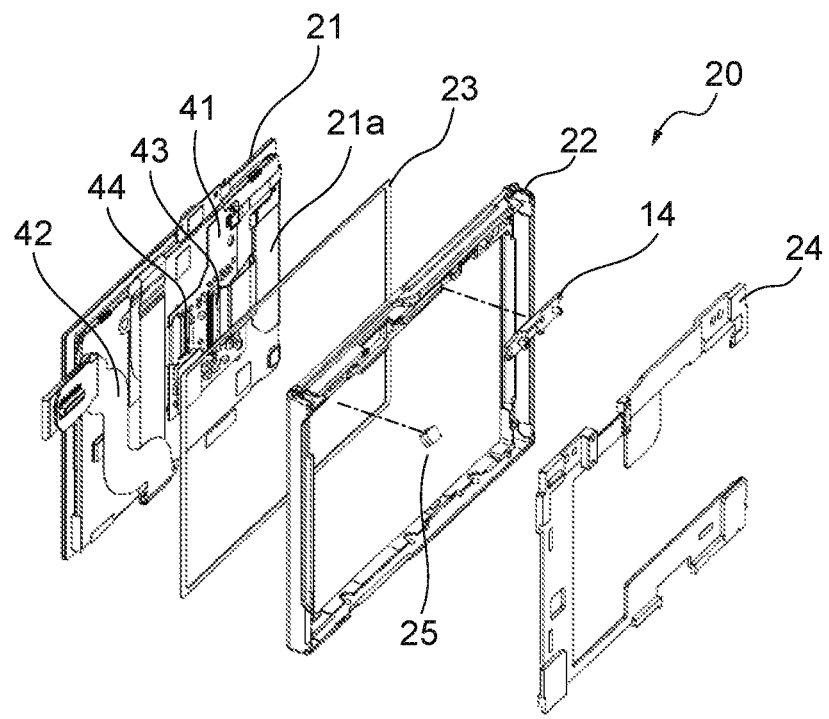
FIG. 2A and FIG. 2B are exploded perspective views showing a display device with which the image pickup apparatus is equipped.
Figure 2B:
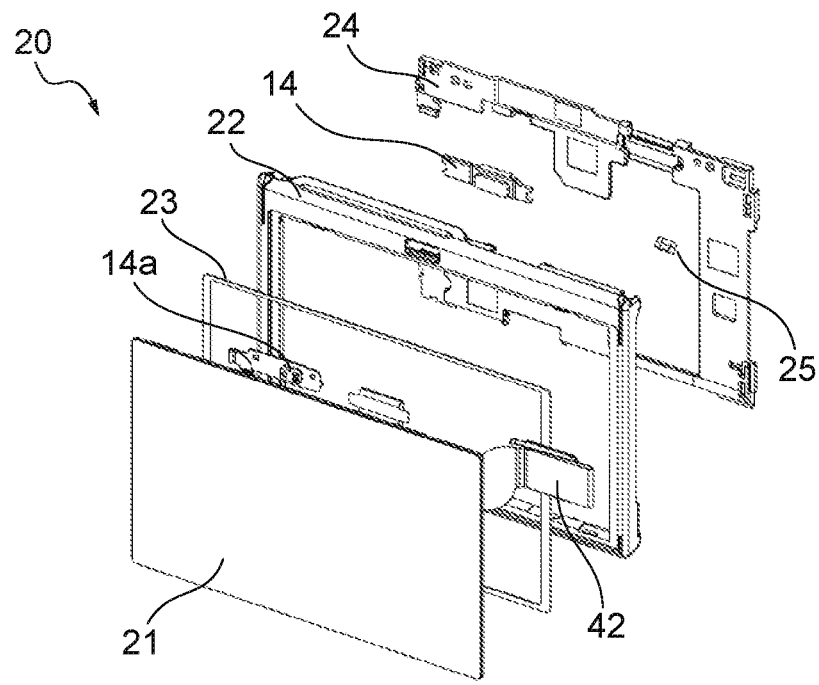

FIG. 2A and FIG. 2B are exploded perspective views showing the display device 20 viewed from different directions, respectively. The display device 20 is mainly constituted by the LCD 21, a display cover 22, a double-stick tape 23, and a spacer 24.

The LCD 21 is configured by uniting a liquid crystal panel, a protection window that protects the liquid crystal panel from external pressure, a crack, and contamination, and a touch panel of a capacitive sensing method that enables an input operation when a user touches. The LCD 21 is adhered on the front surface (a front surface when viewing the display cover 22 from the display screen of the LCD 21) of the display cover 22 using the double-stick tape 23 that is formed into a rectangle frame shape along the contour of the protection window. It is desired that the double-stick tape 23 has large adhesion strength and large impact resistance. This is because floating and exfoliation of the LCD 21 due to impact of falling of the image pickup apparatus 1 are reduced so that breakage of the LCD 21 due to jumping out of the LCD 21 from the display cover 22 will be reduced.

The display cover 22 is a frame that covers the circumference of the LCD 21 and is also an appearance part that supports the LCD 21. Accordingly, predetermined paint is applied to the surface exposed to external appearance in the display cover 22. The proximity-sensor window 14 is fixed with adhesion to the display cover 22 at a position corresponding to the upper frame of the display device 20.

The LCD 21 has a flexible wiring board 21a and a flexible wiring board 41. The flexible wiring board 41 is a substrate that bears display control for the display device 20 and is pasted and fixed to the rear surface (a rear surface when viewing the LCD 21 from the display screen of the LCD 21) of the LCD 21 using a double-stick tape (not shown). The connector 43 is implemented in the flexible wiring board 41. One end of the flexible wiring board 21a is connected with the connector 43, and the other end is electrically connected with a transparent electrode and a back light that constitute the liquid crystal panel. The proximity sensor 14a is implemented on the flexible wiring board 41 and is fixed at a position that faces the proximity-sensor window 14.

One end of the flexible wiring board 42 is connected with a connector 44 implemented on the flexible wiring board 41. The other end of the flexible wiring board 42 is connected with a control board (main substrate, not shown) arranged in the body of the image pickup apparatus 1. Thus, various kinds of electrical signals from the control base provided in the body of the image pickup apparatus 1 are transmitted to the flexible wiring board 41 through the flexible wiring board 42 so as to control display on the LCD 21. It should be noted that some electrical signals supplied to the display device 20 are differential signals for the differential transmission method. A circuit pattern for the differential signals is formed on the flexible wiring board 42 near the approximately center in the width direction of the flexible wiring board 42 by matching impedances so as to satisfy predetermined impedance specification.

The spacer 24 is a molded resin member that seals a gap between the display cover 22 and the hinge mechanism 30. The spacer 24 is attached from the inverse direction of the attachment direction of the LCD 21 to the display cover 22 and is fixed in a sandwiched state between the display cover 22 and the hinge mechanism 30.

A concave portion is formed in the display cover 22. A magnet 25 is stored in the concave portion and is fixed with adhesion. A magnetic field (magnetic flux) that is caused by the magnet 25 is detected by a magnetic sensor (magnetism detecting element (not shown)). A detection result of the magnetic field is used to switch a display orientation on the display device 20. A gigantic magnetoresistance (GMR) element, a semiconductor Hall element, or the like is used as the magnetic sensor. The GMR element detects a magnetic field parallel to a principal plane using a magnetoresistance effect and is made from an alloy (specifically, nickel, steel, and cobalt are main components) of which electric resistance increases as the magnetic field becomes strong. A GMR sensor is constituted by incorporating the GMR element in a determination circuit. In this embodiment, the GMR sensor is implemented in the flexible wiring board (not shown) arranged in the body of the image pickup apparatus 1. A threshold is set for a detection value of the GMR sensor. The GMR sensor detects the level of the magnetic flux that depends on the position of the magnet 25. The display orientation on the display device 20 is switched on the basis of the comparison result of the detected level of the magnetic flux and the threshold. Specifically, when the display device 20 is rotated from a basic posture shown in FIG. 1B so that the bottom part moves upward, the displayed screen on the display device 20 is switched to the display inverted laterally and vertically at a timing when the level detected by the GMR sensor exceeds the threshold.

Next, the configuration of the hinge mechanism 30 that rotatably connects the display device 20 to the body of the image pickup apparatus 1 will be described by referring to FIG. 3A, FIG. 3B, and FIG. 3C. FIG. 3A is an exploded perspective view showing the hinge mechanism 30. FIG. 3B is an enlarged view in an area C in FIG. 3A (one end of a rotation axis A). FIG. 3C is an enlarged view in an area D in FIG. 3A (the other end of the rotation axis A).

The rotation axis A (first rotation axis) is located at the upper portion of the hinge mechanism 30 and is a center axis around which the display device 20 is rotated upward. Moreover, a rotation axis B (second rotation axis) is located at the bottom portion of the hinge mechanism 30 and is a center axis around which the display device 20 is rotated downward. The rotation axis A is approximately parallel to the rotation axis B. As mentioned above, rotating the display device 20 upward means rotating the display device 20 around the upper side of the display device 20 so that the bottom side will draw a circular arc, and in other words, it means an operation of pulling the bottom portion of the display device 20 from the body of the image pickup apparatus 1 and rotating. Rotating the display device 20 downward means rotating the display device 20 around the bottom side of the display device 20 so that the upper side will draw a circular arc, and in other words, it means an operation of pulling the upper portion of the display device 20 from the body of the image pickup apparatus 1 and rotating.

The hinge mechanism 30 has the stand plates 31 and 32, a base plate 33, an arm plate 34, caulking pins 35A1, 35A2, 35B1, and 35B2, plate springs 36A, 36B1, and 36B2.

The stand plates 31 and 32 are arranged at the right and left of the hinge mechanism 30. The stand plate 31 has a rising bent part 31c in which a hole 31b is formed. The stand plate 32 has a rising bent part 32c in which a hole 32b is formed. The base plate 33 has rising bent parts 33c at the right and left. Holes 33a are formed in the upper portions of the rising bent parts 33c. Holes 33b are formed in the bottom portions of the rising bent parts 33c. The holes 33b of the base plate 33 and the holes 31b and 32b of the stand plates 31 and 32 are aligned along the rotation axis B. Stopper 33d are formed in the left and right lower portions of the base plate 33. When the display device 20 is rotated downward by about 45 degrees, the stoppers 33d abut the rising bent parts 31c and 32c of the stand plates 31 and 32, which regulates the downward rotation angle of the display device 20.

The arm plate 34 has rising bent parts 34c at the left and right, and holes 34a are formed in the upper portion of the rising bent part 34c. The holes 34a of the arm plate 34 and the holes 33a of the base plate 33 are aligned along the rotation axis A. Stoppers 33d are formed in the left and right upper portions of the arm plate 34. When the display device 20 is rotated upward by about 180 degrees, the stoppers 33d abut the rising bent parts 33c of the base plate 33, which regulates the upward rotation angle of the display device 20.

The caulking pin 35A1 is caulked in a state where it is inserted through the hole 33a of the base plate 33 and the hole 34a of the arm plate 34. Moreover, the caulking pin 35A2 is caulked in a state where it is inserted through the hole 33a of the base plate 33, the hole 34a of the arm plate 34, and the hole 36a of the plate spring 36A. Thereby, the base plate 33 and the arm plate 34 are connected rotatably around the same axis and falling of the caulking pins 35A1 and 35A2 are prevented. The plate spring 36A is fixed in a bending state in the rotation axis direction so as to give a rotational torque around the rotation axis A when rotating the display device 20.

The caulking pin 35B1 is caulked in a state where it is inserted through the hole 31b of the stand plate 31, the hole 33b of the base plate 33, and the hole 36b1 of the plate spring 36B1. Moreover, the caulking pin 35B2 is caulked in a state where it is inserted through the hole 32b of the stand plate 32, the lower hole 33b of the base plate 33, and the hole 36b2 of the plate spring 36B2. Thereby, the stand plates 31 and 32 are connected with the base plate 33 rotatably around the same axis and falling of the caulking pins 35B1 and 35B2 are prevented. The plate springs 36B1 and 36B2 are fixed in a bending state in the rotation axis direction so as to give rotational torques around the rotation axis B when rotating the display device 20.

It should be noted that the stand plates 31 and 32, the base plate 33, and the arm plates 34 are components manufactured by pressing metal material and have high intensities for a rotary action. Although the plate spring 36A is arranged only in one side (right side) of the rotation axis in this embodiment, plate springs may be arranged in both sides of the rotation axis A as with the configuration of the rotation axis B. The plate springs 36A, 36B1, and 36B2 give the slide torques as rotation loads to the rotation axes A and B. Thereby, the base plate 33 is capable of keeping its position at any rotational angle with respect to the stand plates 31 and 32, and the arm plate 34 is capable of keeping its position at any rotational angle with respect to the base plate 33.

Next, the relation between the body of the image pickup apparatus 1, the display device 20, and the hinge mechanism 30 will be described. FIG. 4 is an exploded perspective view showing the image pickup apparatus 1. The stand plates 31 and 32 of the hinge mechanism 30 (see FIG. 3A) are fixed to the rear surface of the body of the image pickup apparatus 1 with screws 26a and 26b. Moreover, the arm plate 34 of the hinge mechanism 30 is fixed to the rear surface of the display cover 22 with screws 27a and 27b and is fixed to the bottom surface of the display cover 22 with screws 28a, 28b, and 28c. Thus, the display device 20 and the body of the image pickup apparatus 1 are connected through the hinge mechanism 30.

FIG. 5A is a perspective view showing the basic posture of the display device 20. In the basic posture, the display device 20 is stored at the side of the rear surface of the body of the image pickup apparatus 1. The basic posture is used when a user who is in the rear side of the image pickup apparatus 1 shoots an object in front of the lens barrel unit or reproduces a shot image.

FIG. 5B is a perspective view showing a posture (hereinafter referred to as a "reversal posture") in which the display device 20 is rotated upward by 180 degrees. The reversal posture is used at a time of selfie shooting, for example. The above-mentioned slide torques enable the display device 20 to keep its position at any angle between the basic posture and the reversal posture. A posture in which the display device 20 is rotated at a predetermined angle so that the display screen will be directed upward is used when a user shoots an object while holding the image pickup apparatus 1 at a low position, for example.

FIG. 5C is a perspective view showing a posture (hereinafter referred to as a "downward posture") in which the display device 20 is rotated downward by 45 degrees. The downward posture is used when a user shoots an object while holding the image pickup apparatus 1 at a high position. It should be noted that the above-mentioned slide torques enable the display device 20 to keep its position at any angle between the basic posture and the downward posture. Thus, the hinge mechanism 30 enables the display device 20 to take various styles (angles) with respect to the body of the image pickup apparatus 1, which enables the image pickup apparatus 1 to cope with various shooting methods and shooting conditions.

Next, the configuration of the EVF 10 will be described. FIG. 6 is an exploded perspective view showing the EVF 10. The EVF 10 has a base unit 100, display unit 110, cover unit 140, wiring board 150, and a flexible wiring board 151. The display unit 110 has a body 120 and an eyepiece 130. The body 120 has an organic EL panel 121 as a display device that displays an image and information, a lens 122, and a detection switch (first sensor) 123 for detecting that the eyepiece 130 is pulled. The eyepiece 130 has an eyepiece window 131, an eyepiece window frame 132, a diopter adjustment lever 133 that is used to adjust diopter, and a grip 134 for pulling the eyepiece 130 from the body 120 (the cover unit 140).

The display unit 110 is positioned to the base unit 100 and is fixed to the base unit 100 with three screws 111, 112, and 113. The cover unit 140 has a top surface cover 141 and a side surface cover 142 that are unified by adhesion. The cover unit 140 covers the circumference of the display unit 110 and constitutes a part of the top surface of the image pickup apparatus 1 in a state where the EVF 10 is stored in the body of the image pickup apparatus 1. The cover unit 140 is fixed to the base unit 100 with screws 143 and 144 and the screw 113 as a co-fastening screw together with the display unit 110 while positioning to the base unit 100. The wiring board 150 implements various kinds of electronic parts and controls the display of the EVF 10. The wiring board 150 is positioned to the display unit 110 and is fixed to the display unit 110 with a screw 153. The flexible wiring board 151 is used to connect with the control board (not shown) arranged in the body of the image pickup apparatus 1 and is connected with the wiring board 150 through a connector 152.

FIG. 7A is an exploded perspective view showing the base unit 100. FIG. 7B is a sectional view from an arrow A-A in FIG. 7A. The base unit 100 has a base 101, a chassis 102, a pair of shafts 103, a pair of shaft springs 104, a pair of shaft cushions 105, a base plate 106, a lock lever 107, a lock lever shaft 108, and a lock spring 109.

Two holes 101a through which the shafts 103 are inserted are provided in the base 101. A step 101b is provided in each of the two holes 101a. A lock pin 102a is fixed to the chassis 102. Moreover, an arm 102b is provided in the chassis 102, and an engagement part 102c is formed at the front end of the arm 102b. The chassis 102 is provided with screw holes to which the screws 111, 112, 113, 143, and 144 are fastened. The display unit 110 and the cover unit 140 are fixed to the chassis 102.

A flange 103a is provided in each of the shafts 103. The flange 103a abuts the step 101b and is positioned. The shaft cushion 105 is pasted on the flange 103a in order to mitigate impact occurred when the EVF 10 projects upward from the body of the image pickup apparatus 1. The shaft 103 is inserted through the hole 101a of the base 101 and is caulked to the chassis 102. Thereby, since the top end of the shaft 103 is fixed to the chassis 102 and the flange 103a defines the uppermost position of the shaft 103 with the step 101b, falling of the shaft 103 from the hole 101a of the base 101 is prevented.

The shaft spring 104 is inserted in each of the two holes 101a of the base 101. When the base plate 106 is attached so as to cover the two holes 101a, one end of the shaft spring 104 abuts the flange 103a provided in the shaft 103 and the other end abuts the base plate 106. As a result, the shaft 103 is energized upward. That is, the shaft springs 104 energize the display unit 110 and the cover unit 140 upward. The base plate 106 is fixed to the base 101 with a hooking claw and a screw.

The lock lever 107 is attached to the upper side surface of the base plate 106 so as to be rotatable with respect to the base plate 106 around the lock lever shaft 108 as a rotation shaft. The lock lever shaft 108 is fixed to the base plate 106. The lock spring 109 is hooked on a hook 106a provided in the base plate 106 and a hook 107a provided in the lock lever 107. The lock spring 109 energizes the lock lever 107 counterclockwise a direction of an arrow R) with respect to the base plate 106 around the lock lever shaft 108 as the rotation shaft. A contact part 107b is provided in the lock lever 107. When the operation lever 11 (see FIG. 1A) is operated, the operation lever 11 abuts the contact part 107b and rotates the lock lever 107 clockwise against the energization force of the lock spring 109. Details will be mentioned later.

The lock lever 107 is provided with an engagement part 107c that engages the lock pin 102a fixed to the chassis 102 when the EVF 10 is in a retracted state (see FIG. 1A). Moreover, the lock lever 107a is also provided with a lock pin 107d. The lock pin 107d engages the engagement part 102c of the chassis 102 in the state where the EVF 10 projects upward. Details will be mentioned later.

Figure 8A:
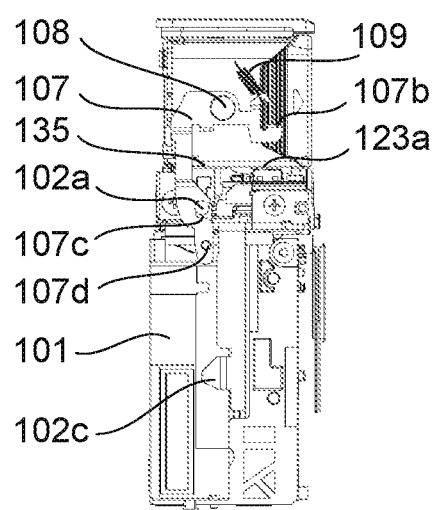
Figure 8B:
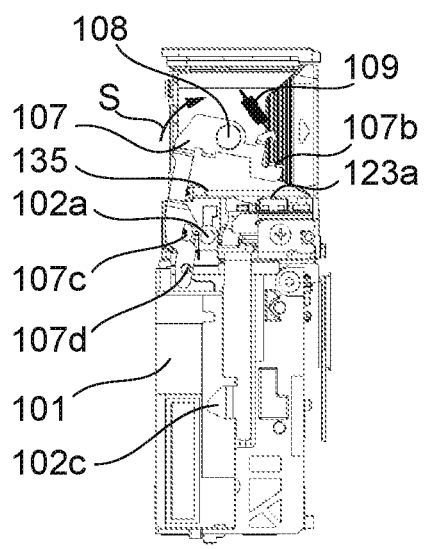
Figure 8C:
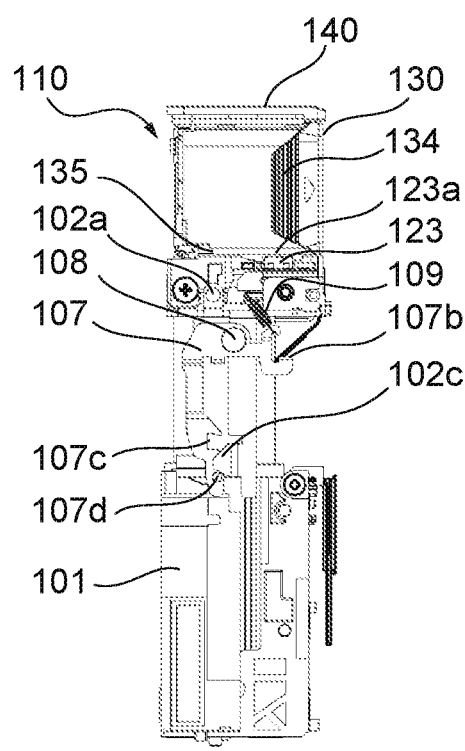
Figure 8D:
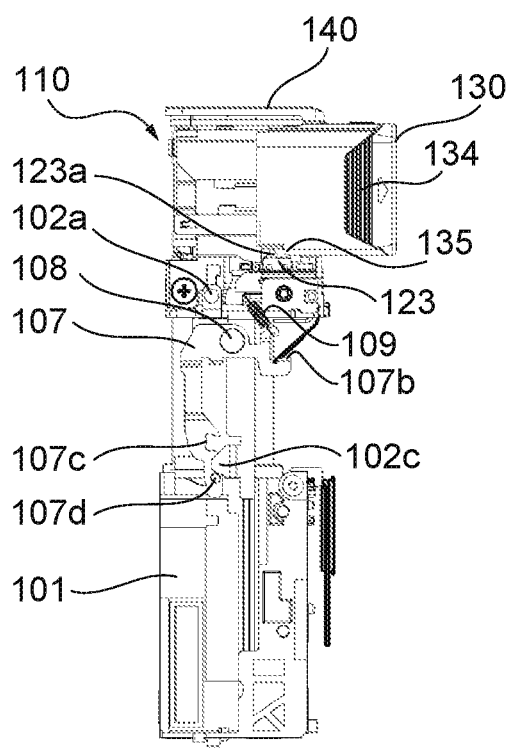

FIG. 8A, FIG. 813, FIG. 8C, and FIG. 8D are side views for describing various states of the EVF 10. FIG. 8A is the side view showing the state where the display unit 110 and the cover unit 140 of the EVF 10 are retracted in the body of the image pickup apparatus 1. FIG. 8B is the side view showing a state where the EVF 10 is retracted in the image pickup apparatus 1 and the lock lever 107 rotated clockwise (in the direction of an arrow S). FIG. 8C is the side view showing a state where the display unit 110 and the cover unit 140 of the EVF 10 projected upward from the top surface of the body of the image pickup apparatus 1. FIG. 8D is the side view showing a state where the eyepiece 130 was pulled out from the state in FIG. 8C and the EVF 10 became usable. It should be noted that the base plate 106 and the side surface cover 142 constituting the cover unit 140 are not shown in FIG. 8A through FIG. 8D.

As mentioned above, the display unit 110 and the cover unit 140 are always energized upward with the shaft springs 104 in the EVF 10. In the meantime, when the display unit 110 and the cover unit 140 are retracted in the body of the image pickup apparatus 1 as shown in FIG. 8A, the lock pin 102a provided in the chassis 102 engages the engagement part 107c provided in the lock lever 107. In this state, the display unit 110 and the cover unit 140 cannot project upward.

When the operation lever 11 (see FIG. 1A) is slidingly operated downward from the retracted state in FIG. 8A, the operation lever 11 abuts the contact part 107b provided in the lock lever 107 as shown in FIG. 8B. Then, the lock lever 107 rotates clockwise (in the direction of the arrow S) around the lock lever shaft 108 as the rotation shaft. Thereby, the engagement between the lock pin 102a of the chassis 102 and the engagement part 107c of the lock lever 107 is released. As a result, the display unit 110 and the cover unit 140 project upward with the chassis 102 and the shafts 103 by the energization of the shaft springs 104 as showy in FIG. 8C.

In the state in FIG. 8C, the display unit 110 and the cover unit 140 stop at predetermined positions projected upward and keep static states because the lock pin 107d of the lock lever 107 engages the engagement part 102c of the chassis 102. When the top surface of the cover unit 140 is pushed toward the inside of the body of the image pickup apparatus 1 by the load beyond the energization force to the lock lever 107 by the lock spring 109, the lock pin 107d of the lock lever 107 slides along a slant surface of the engagement part 102c provided in the chassis 102. Then, the lock lever 107 rotates clockwise, the lock pin 107d of the lock lever 107 separates from the engagement part 102c of the chassis 102, and the display unit 110 and the cover unit 140 are retracted inside the body of the image pickup apparatus 1. Thus, the push operation to the top surface of the cover unit 140 of the EVF 10 is sufficient to retract the display unit 110 and the cover unit 140 into the body of the image pickup apparatus 1. The operation of the operation lever 11 is not necessary.

The grip 134 is provided in the eyepiece 130. A user can pull the eyepiece 130 from the housing position in the cover unit 140 to a use position by holding the grip 134. The eyepiece 130 is movable between the housing position and the use position. Accordingly, the user can return the eyepiece 130 to the housing position by pushing the eyepiece 130 in the use position toward the cover unit 140 while holding the grip 134.

In the state in FIG. 8D where the user pulled the eyepiece 130 to the use position, the EVF 10 becomes usable, i.e., the display unit 110 is allowed to display an image. In the state where the EVF 10 is usable, a contact part 135 provided in the eyepiece 130 does not abut a switch knob 123a provided in the detection switch 123, and the detection switch 123 is in an OFF state. As compared with this, in the states in FIG. 8A through FIG. 8C, the switch knob 123a is pressed by the contact part 135 of the eyepiece 130, and the detection switch 123 is in an ON state.

When the proximity sensor 14a does not detect approaching of an object, such as a user's face, the image pickup apparatus 1 controls the display device 20 to display an image and controls the EVF 10 not to display an image. In the meantime, when the proximity sensor 14a detects approaching of an object, the image pickup apparatus 1 controls the display device 20 to turn OFF (stop) the display and controls the EVF 10 to turn ON (start) the display.

To enable or disable the above-mentioned display control to the display device 20 and the EVF 10 is switched according to the state of the detection switch 123. That is, in the state where the eyepiece 130 is pulled and the detection switch 123 is OFF, the above-mentioned display control based on the output of the proximity sensor 14a is enabled. As compared with this, in the state where the detection switch 123 is ON (the eyepiece 130 is not pulled), even if the proximity sensor 14a detects approaching of an object, the above-mentioned display control is disabled, and the image pickup apparatus 1 controls the display device 20 to display an image (ON) and controls the EVF 10 not to display an image (OFF). Such display control is executed by a microcomputer (an MPU (a controller)) implemented in the control board arranged in the body of the image pickup apparatus 1.

One reason why such display control is performed is because the EVF 10 is designed so that the lens 122 is focused on the organic EL panel 121 only when the eyepiece 130 is pulled. In other words, it is preferable not to display an image on the EVF 10 in the state where the eyepiece 130 is not pulled even if the display unit 110 and the cover unit 140 projected upward from the body of the image pickup apparatus 1 as shown in FIG. 8C. Moreover, such a configuration prevents the display device 20 from turning OFF (stopping) unexpectedly when the EVF 10 is not usable.

Since the proximity-sensor window 14 is provided in the upper frame of the display device 20 as shown in FIG. 1B and FIG. 5A, the orientation of the proximity-sensor window 14 depends on the rotation angle of the display device 20. Moreover, since the display control based on the detection result of the proximity sensor 14a is not performed in the state where the eyepiece 130 is not pulled as mentioned above, the rotation of the display device 20 does not affect the display control. However, when the display device 20 is rotated in the state where the EVF 10 is usable, the display control based on the detection result of the proximity sensor 14a may be performed because the proximity sensor 14a may detect the body of the image pickup apparatus 1 or the eyepiece 130 at some angles of the display device 20. Accordingly, a configuration for preventing such a problem from arising will be described.

Figure 9A:
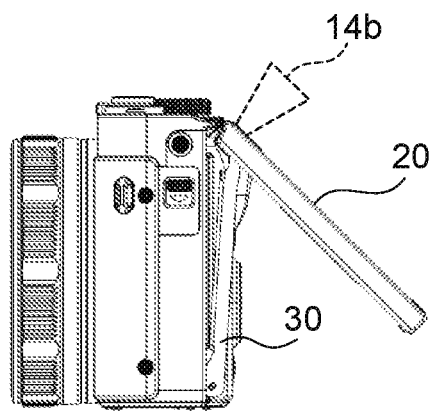
Figure 9B:
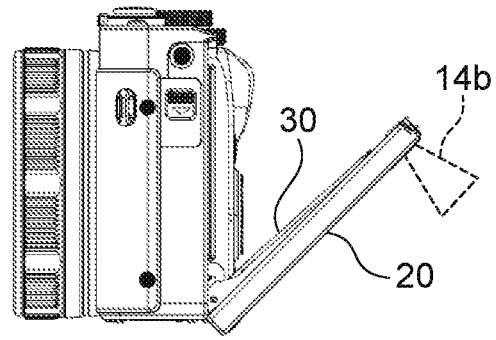
Figure 9C:
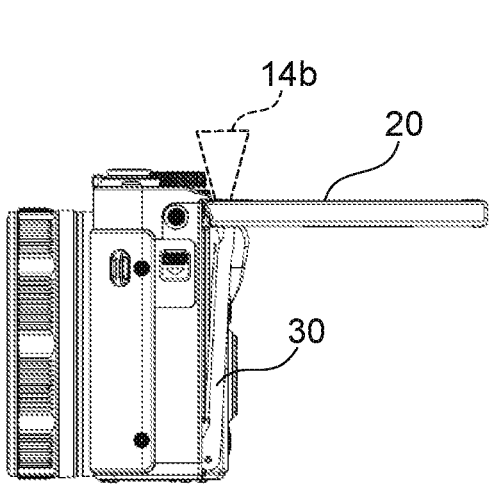
Figure 9D:
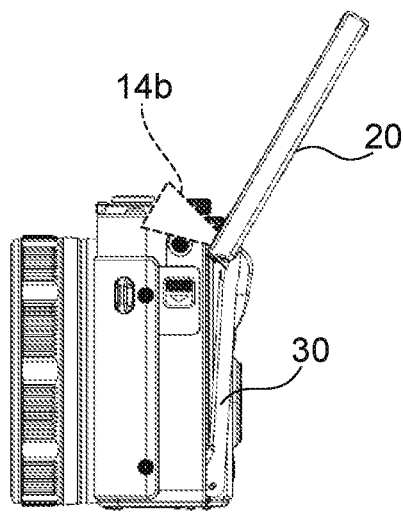

FIG. 9A through FIG. 9D are side views for describing a relation between the posture of the display device 20 and an object detection range 14b of the proximity sensor 14a. FIG. 9A shows the state where the display device 20 is rotated upward by about 45 degrees. FIG. 9B shows the state where the display device 20 is rotated downward by about 45 degrees. FIG. 9C shows the state Where the display device 20 is rotated upward by about 90 degrees. FIG. 9D shows the state where the display device 20 is rotated upward by about 150 degrees.

It is preferable that the state where the EVF 10 projects from the body of the image pickup apparatus 1 be shown in FIG. 9A, FIG. 9B, FIG. 9C, and FIG. 9D. In the meantime, it is necessary to describe the change of the object detection range 14b of the proximity sensor 14a according to the posture of the display device 20 plainly. Moreover, when the posture of the display device 20 varies, the proximity sensor 14a may detect the body of the image pickup apparatus 1 but does not detect the EVF 10. Accordingly, the state where the EVF 10 is retracted in the body of the image pickup apparatus 1 is shown in FIG. 9A, FIG. 9B, FIG. 9C, and FIG. 9D.

When the display device 20 takes the posture as shown in FIG. 9A or FIG. 9B, the object detection range 14b of the proximity sensor 14a is directed to the rear side of the image pickup apparatus 1. In these state, when a user makes the EVF 10 project from the body of the image pickup apparatus 1 and pulls (or pulled) the eyepiece 130, the control for turning ON the EVF 10 can be executed by approaching the face to the rear surface of the image pickup apparatus 1.

In the meantime, when the display device 20 takes the posture as shown in FIG. 9C or FIG. 9D, the object detection range 14b of the proximity sensor 14a is deviated from the rear side of the image pickup apparatus 1. Accordingly, when the EVF 10 is usable and the display device 20 is in the posture shown in FIG. 9C or FIG. 9D, the display on the EVF 10 may not turn ON even if the user approaches the face to the rear surface of the image pickup apparatus 1.

However, when the display device 20 takes the posture shown in FIG. 9C, the user shoots an object while holding the image pickup apparatus 1 at a low position in many cases. Accordingly, there is low possibility of looking into the eyepiece 130 when shooting. Moreover, when the display device 20 takes the posture shown in FIG. 9D, the eyepiece 130 is covered with the display device 20 even if the eyepiece 130 was pulled, it is physically impossible to look at an image displayed on the display unit 110 through the eyepiece 130. Accordingly, even if the display on the EVF 10 does not turn ON in the state shown in FIG. 9C or FIG. 9D, there is no problem practically.

In the meantime, when the EVF 10 is usable and the display device 20 takes the posture shown in FIG. 9D, the display control to turn ON the display on the EVF 10 and to turn OFF the display of the display device 20 may be performed. This is because the body of the image pickup apparatus 1 will enter into the object detection range 14b of the proximity sensor 14a. As mentioned above, since the posture of the display device 20 as shown in FIG. 9D is used for selfie shooting, it is necessary to prevent the display device 20 from turning OFF unexpectedly.

Figure 10A:
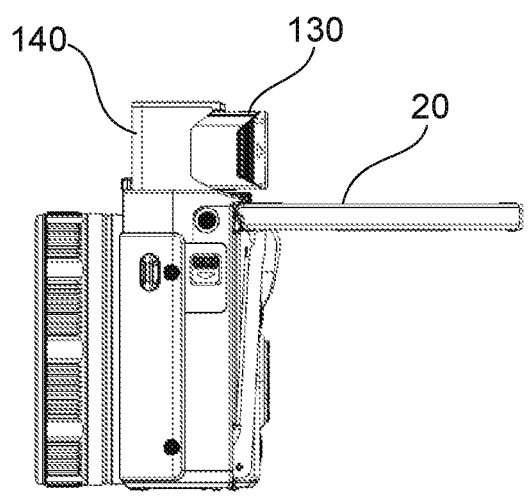
Figure 10B:
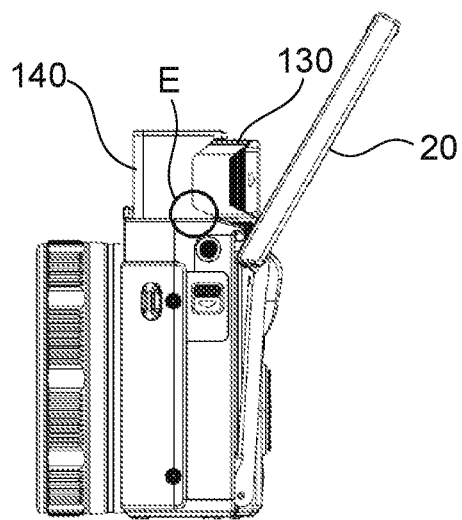
Figure 10C:
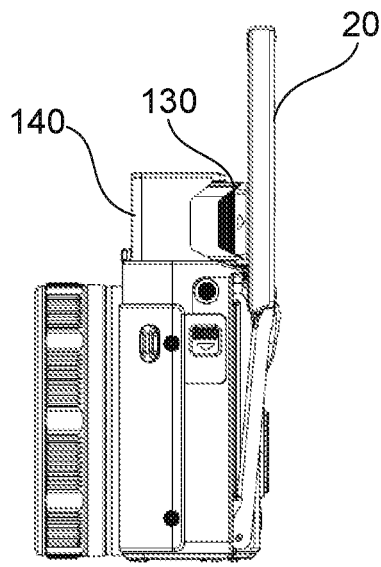
Figure 10D:
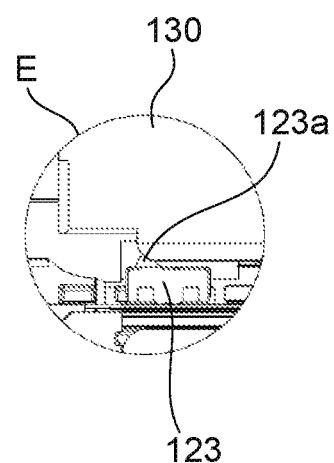

Next, the configuration for preventing the display device 20 from turning OFF unexpectedly when the display device 20 is rotated upward will be described by referring to FIG. 10A, FIG. 10B, FIG. 10C, and FIG. 10D. FIG. 10A through FIG. 10C are side views showing the image pickup apparatus 1 in the state where the EVF 10 is usable and the display device 20 is rotated to the predetermined angles. Specifically, FIG. 10A shows the state where the display device 20 is rotated upward by about 90 degrees. FIG. 10B shows the state where the display device 20 is rotated upward by about 150 degrees. FIG. 10C shows the reversal state where the display device 20 is rotated upward by about 180 degrees. FIG. 10D is an enlarged view in an area. E shown in FIG. 10B. The cover unit 140 is not shown.

In the state shown in FIG. 10A, since the body of the image pickup apparatus 1 does not enter into the object detection range 14b of the proximity sensor 14a as with the state shown in FIG. 9C, the proximity sensor 14a is not detecting the body of the image pickup apparatus 1. When the display device 20 reaches the state shown in FIG. 10B while rotating the display device 20 from the state shown in FIG. 10A to the state shown in FIG. 10C, the body of the image pickup apparatus 1 begins to enter into the object detection range 14b of the proximity sensor 14a as shown in FIG. 9D (the angle of the display device 20 is the same as that in FIG. 10B). Then, the eyepiece 130 begins to be pushed by the display device 20 toward the display unit 110. As a result, as shown in FIG. 10D, the switch knob 123a of the detection switch 123 provided in the body 120 of the EVF 10 is pressed by the eyepiece 130, and the detection switch 123 becomes the ON state. Thus, since the EVF 10 becomes unusable, the display control based on the detection result of the proximity sensor 14a is not performed even if the proximity sensor 14a detects an object (the body of the image pickup apparatus 1). Accordingly, the display device 20 is prevented from turning OFF unexpectedly during a process of rotating the display device 20 upward.

In the state where the display device 20 is rotated upward beyond the angle shown in FIG. 10B (for example, the state shown in FIG. 10C), the ON state of the detection switch 123 is maintained. Accordingly, also in the state shown in FIG. 10C, although the proximity sensor 14a is detecting approaching of the object, the display control based on the detection result of the proximity sensor 14a is not performed.

As described above, the image pickup apparatus 1 concerning this embodiment is capable of stopping the display control based on the detection result of the proximity sensor 14a when the body of the image pickup apparatus 1 enters into the object detection range 14b of the proximity sensor 14a during the rotation of the display device 20. This enables the display device 20 to prevent from stopping the display unexpectedly.

Next, the relation between the load needed to push the eyepiece 130 toward the display unit 110 and the torque applied to the rotation section of the hinge mechanism 30 will be described by referring to FIG. 11A and FIG. 11B. FIG. 11A and FIG. 11B show an image pickup apparatus 1' of a reference example that cannot push the eyepiece 130 toward the display unit 110 by force generated by rotating the display device 20. FIG. 11A is a side view showing the image pickup apparatus 1' in a state where the display device 20 is rotated upward by about 165 degrees. FIG. 11B is a side view showing the image pickup apparatus 1' in the reversal state where the display device 20 is rotated upward by about 180 degrees. Since a different point between the image pickup apparatus 1 concerning this embodiment and the image pickup apparatus 1' is only the slide torque required for rotating the display device 20 around the rotation axis B, the components of the image pickup apparatus 1' that are the same as the components of the image pickup apparatus 1 will be denoted by the same reference numerals and will be described.

As mentioned above, the configuration that enables to push the eyepiece 130 toward the display unit 111 by the force generated by rotating the display device 20 is desirable in order to easily prevent the display device 20 from turning OFF unexpectedly when the display device is rotated. When the slide torque required to rotate the display device 20 around the rotation axis B of the hinge mechanism 30 is smaller than the load required to push the eyepiece 130, the hinge mechanism 30 begins to rotate around the rotation axis B without pushing the eyepiece 130. Then, even if the display device 20 is rotated from the state shown in FIG. 11A to the state shown in FIG. 11B, the eyepiece 130 will not be pushed toward the display unit 110, and the display device 20 will turn OFF in the state shown in FIG. 11B.

In order to avoid such a problem, the image pickup apparatus 1 concerning this embodiment is designed so that the slide torque of the rotation around the rotation axis B will be larger than the rotation torque around the rotation axis B that is applied by reaction force of load needed for pushing the eyepiece 130. Accordingly, when the display device 20 is rotated, the display device 20 and the eyepiece 30 behave as shown in FIG. 10B and FIG. 10C without behaving as shown in FIG. 11A and FIG. 11B.

In the above description, the display device 20 employs the LCD 21 and the EVF 10 employs the organic EL panel 121. However, other display devices that are capable of displaying an image and information may be employed. Moreover, the hinge mechanism 30 has the two rotation axes A and B at the upper and lower portions so that the display device 20 is rotatable around the two axes. However, the hinge mechanism may have the rotation axis A only. In this case, although the display device 20 cannot be rotated downward, it is available to rotate the display device 20 upward to about 180 degrees. Accordingly, the configuration that switches to enable or disable the above-mentioned display control based on the detection result of the proximity sensor 14a using the detection result of the detection switch 123 is applicable to an image pickup apparatus that has the rotation axis A only.

Furthermore, although the proximity sensor 14a and the proximity-sensor window 14 are provided in the upper frame of the display device 20 in the image pickup apparatus 1, the positions of the proximity sensor 14a and the proximity-sensor window 14 are not limited to the embodiment, but can be arranged within the display device 20 in the range in which approaching of a user's face is detectable. However, when the proximity-sensor window 14 is provided in the upper frame of the display device 20, it is preferable not to arrange the proximity-sensor window 14 directly under the eyepiece 130 of the EVF 10. If the proximity-sensor window 14 is arranged directly under the eyepiece 130, the proximity sensor 14a should detect the eyepiece 130 in the state shown in FIG. 10A and the display of the display device 20 should turn OFF.

The proximity sensor 14a and the proximity-sensor window 14 may be arranged to the rear surface of the body of the image pickup apparatus 1 or the eyepiece 130 instead of the display device 20. In such a case, the proximity-sensor window 14 is arranged at a position that is not covered by the display device 20 that is in the basic posture shown in FIG. 1B. In this case, when the configuration that switches to enable or disable the display control based on the detection result of the proximity sensor 14a according to the upward rotation angle of the display device 20 is employed, the display device 20 is prevented from turning OFF unexpectedly.

It should be noted that the image pickup apparatus 1 is configured to push the pulled eyepiece 130 (the eyepiece window frame 132) to the cover unit 140 by abutting the LCD 21 of the display device 20. As compared with this, as shown in FIG. 12A and FIG. 12B, the image pickup apparatus may be configured so that the LCD 21 will not directly abut the eyepiece window 131. FIG. 12A is a partial rear view of the image pickup apparatus that is configured to provide a rib 22a for abutting in the display cover 22 of the display device 20. FIG. 12B is a side view showing a state where the rib 22a abuts the eyepiece window frame 132 by rotating the display device 20 upward by about 180 degrees. Arrangement of the rib 22a is capable of protecting the eyepiece 130 and the LCD 21.

Next, a second embodiment of the present invention will be described. The image pickup apparatus 1 concerning the first embodiment has the configuration in which the proximity sensor 14a and the proximity-sensor window 14 are provided in the upper frame of the display device 20. As compared with this, a configuration that is not provided with the proximity sensor 14a and the proximity-sensor window 14 will be described as the image pickup apparatus concerning the second embodiment.

Since the configurations of the body of the image pickup apparatus, the EVF 10, and the hinge mechanism 30 concerning the second embodiment are identical to that of the image pickup apparatus 1 concerning the first embodiment, their descriptions are omitted. Moreover, since the display device of the image pickup apparatus concerning the second embodiment is the same as the display device 20 of the image pickup apparatus 1 concerning the first embodiment except for the point that the proximity sensor 14a and the proximity-sensor window 14 are not provided, the detailed description is omitted. The components of the image pickup apparatus concerning the second embodiment that are the same as the components of the image pickup apparatus 1 concerning the first embodiment will be denoted by the same reference numerals for convenience of description.

Although the image pickup apparatus concerning the second embodiment is not provided with the proximity sensor 14a and the proximity-sensor window 14, the detection switch 123 is arranged in the body 120 of the display unit 110 constituting the EVF 10 as with the image pickup apparatus 1 concerning the first embodiment. The detection switch 123 is in the ON state when the eyepiece 130 is not pulled. And the detection switch 123 is in the OFF state when the eyepiece 130 is pulled.

The image pickup apparatus concerning the second embodiment controls the display device 20 to turn ON and controls the EVF 10 to turn OFF when the detection switch 123 is in the OFF state as with the image pickup apparatus 1 concerning the first embodiment. Moreover, when the detection switch 123 is turned to the OFF state, the display on the display device 20 is turned OFF and the display on the EVF 10 is turned ON. That is, the display on the EVF 10 is turned ON only When the EVF 10 is usable, which saves power consumption.

A display control method in the state where the display devices 20 is rotated upward by 180 degrees will be described by referring to FIG. 10A through FIG. 10D.

Although FIG. 10A through FIG. 10D are used for describing the first embodiment, the second embodiment will be described also by referring to FIG. 10A through FIG. 10D for convenience because the different point is presence or absence of the proximity sensor 14a and the proximity-sensor window 14 (not shown in FIG. 10A through FIG. 10D).

In the state where the display device 20 is rotated upward by about 90 degrees (FIG. 10A), since the detection switch 123 is in the OFF state, the display on the display device 20 turns OFF and the display on the EVF 10 turns ON. When the display device 20 is rotated upward by about 150 degrees (FIG. 10B), the detection switch 123 becomes the ON state because the eyepiece 130 is pushed by the display device 20 and presses the switch knob 123a. As a result, the display on the display device 20 turns ON and the display on the EVF 10 turns OFF. Furthermore, even if the display device 20 is rotated upward by about 180 degrees (FIG. 10C), since the detection switch 123 keeps the ON state, the display on the EVF 10 keeps the OFF state and the display on the display device 20 keeps the ON state.

In this way, in the second embodiment, when the display device 20 is rotated in the state where the eyepiece 130 of the EVF 10 is pulled, the display destination is switched between the EVF 10 and the display device 20 on the basis of the rotation angle. Accordingly, even if the proximity sensor 14a is not provided, the display destination can be switched by easy operation.

As mentioned above, although the present invention has been described in detail on the basis of the suitable embodiment, the present invention is not limited to the specific embodiment, and the present invention includes various configurations as long as they do not deviate from the scope of the invention. Furthermore, the embodiments mentioned above show examples of the present invention, and it is possible to combine the embodiments suitably.

For example, when the image pickup apparatus is provided with the proximity sensor 14a, a means for switching to enable or disable the display control based on the detection result of the proximity sensor 14a may be provided. In that case, when the display control based on the detection result of the proximity sensor 14a is disabled, the control similar to that in the second embodiment will be performed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180670, filed Sep. 26, 2018, which is hereby incorporated by reference herein in its entirety.

What is claimed is:
1. An image pickup apparatus comprising:
a first display device that is provided in a rear face of a body of the image pickup apparatus and is rotatable upward around a first rotation axis;
a second display device having an eyepiece that is movable between a housing position and a use position;
a first sensor that detects whether the eyepiece is in the use position;
a second sensor that detects approaching of an object to the eyepiece; and a controller that controls the first display device and the second display device based on a detection result of the first sensor and a detection result of the second sensor,
wherein the controller enables predetermined control that is set in association with the detection result of the second sensor in a state where the first sensor is detecting that the eyepiece is in the use position and disables the predetermined control in a state where the first sensor is detecting that the eyepiece is not in the use position.

2. The image pickup apparatus according to claim 1, wherein the predetermined control displays on the second display device without displaying on the first display device in a case where the second sensor is detecting approaching of an object, and
wherein the predetermined control displays on e first display device without displaying on the second display device in a case where the second sensor is not detecting approaching of an object.

3. The image pickup apparatus according to claim 1, wherein the first display device contacts the eyepiece that is in the use position in a case where the rotation angle of the first display device reaches a predetermined angle, and
wherein the first sensor detects that the eyepiece is not in the user position because the first display device pushes the eyepiece from the use position toward the housing position in a case where the first display device is rotated beyond the predetermined angle.

4. The image pickup apparatus according to claim 3, wherein the first display device is rotatable downward around a second rotation axis that is approximately parallel to the first rotation axis, and
wherein slide torque of the rotation around the second rotation axis is larger than rotation torque around the second rotation axis that is applied by reaction force of force needed for an action that pushes the eyepiece towards the housing position by rotating the first display device.

5. The image pickup apparatus according to claim 3, wherein the first display device has a rib that contacts the eyepiece in the case where the rotation angle of the first display device reaches the predetermined angle.

6. The image pickup apparatus according to claim 1, wherein the second sensor is provided in an upper frame of the first display device.

7. The image pickup apparatus according to claim 1, wherein the second sensor is provided in the rear face of the body of the image pickup apparatus.

8. The image pickup apparatus according to claim 1, wherein the second sensor is arranged at the eyepiece.

9. The image pickup apparatus according to claim 1, wherein the second display device of which the eyepiece is in the housing position is further retractable into the body of the image pickup apparatus.

* * * * *